Sept. 7, 1926.  
J. E. McCAUGHEY  
1,599,179  
OIL PAN HEATER FOR MOTOR VEHICLES  
Filed Feb. 11, 1925
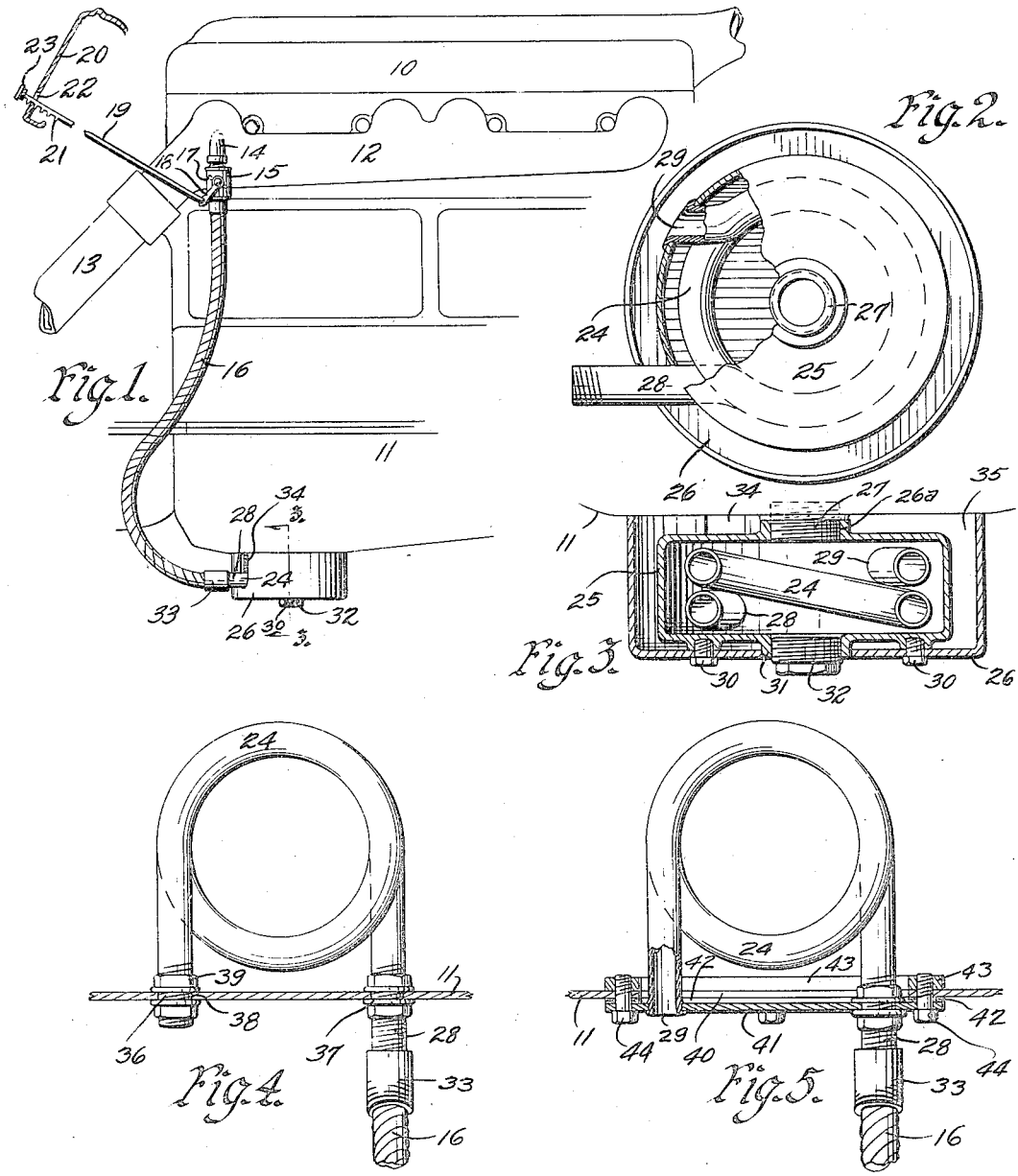

Patented Sept. 7, 1926.

1,599,179

UNITED STATES PATENT OFFICE.

JOSEPH E. McCAUGHEY, OF DES MOINES, IOWA.

OIL-PAN HEATER FOR MOTOR VEHICLES.

Application filed February 11, 1925. Serial No. 8,376.

The purpose of my invention is to provide an oil pan heater of simple, durable and inexpensive construction adapted for use with motor vehicles.

More particularly, it is my purpose to provide an oil pan heater of the kind described adapted to utilize the hot exhaust gases for warming the oil in the crank case.

Another purpose of my invention is to provide such a device, which can be readily, easily and quickly installed on the motor vehicle.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of a portion of a motor vehicle engine and car equipped with an oil pan heater embodying my invention.

Figure 2 is a top or plan view of the heater, parts being shown in section and parts being broken away.

Figure 3 is a detailed, sectional view taken on the line 3—3 of Figure 1.

Figure 4 is a sectional view of a portion of the crank case or oil pan equipped with a modified form of my heater.

Figure 5 is a similar view illustrating another type of installation; and

Figure 6 is an inside elevation of a form of the device shown in Figure 5, parts being broken away.

In parts of the country, where severe cold weather is experienced, many evils arise from stiffening of the oil in the oil pan and crank case due to the low temperature.

It is well-known that where a car is kept in a cold garage, the oil becomes stiff. When the oil is stiff, it is not properly conveyed to the bearings for lubrication, and they are frequently burned out when the car is run after the oil has been subjected to the cold weather for a considerable time. Another common evil in cold weather arises from dilation of oil in the crank case with gasoline and water. With my heater, the gasoline and water are quickly evaporated out.

In order to avoid these difficulties, which might be greatly enlarged upon, I have provided my oil pan heater. I have illustrated the device in several forms adaptable for use with different makes of motor vehicles. In Figures 1, 2 and 3, I have shown the heater adapted for use on a large number of cars including those which use the well-known Continental motor. In Figure 4, I have illustrated the heater adapted for use with Paige and Jewett cars. In Figures 5 and 6, the heater is shown for installation on Dodge automobiles.

In the accompanying drawings, I have used the reference numeral 10 to indicate generally the engine structure of a motor vehicle having at its lower part the oil pan 11. In all the forms in which my heater is installed, I tap the exhaust manifold 12 preferably opposite the exhaust valve nearest the exhaust discharge pipe 13 with an elbow or short pipe 14. The pipe 14 is connected through a fitting 15 to a flexible tube 16. In the fitting 15 is a control valve 17. An arm 18 is fixed to the stem of the valve. Pivoted to the arm 18 is a control rod 19, which is extended rearwardly and upwardly through the instrument board 20 or the dash of the car.

The rod 19 is provided adjacent to the instrument board 20 with a series of teeth or fingers 21 adapted to coact with the instrument board 20 at the lower edge of the hole 21 therein. The rod 19 is extended through the hole 21 and provided at its upper end with a hole 22 and head 23. The flexible tube 17 in all forms of my invention is connected at its lower end with a coil 24.

In the form of my invention illustrated in Figures 1, 2 and 3, the coil 24 is received in a casing 25. The casing 25 has at its upper end the screw-threaded opening 26ª, in which is mounted a suitable nipple 27. One end of the coil 24 projects from the casing 25, as illustrated at 28, for connection with the tube 16. The other end of the coil, as at 29, is mounted in the walls of the casing 25 and is open to the outside air.

The casing 25 is received in another casing 26 open at its upper side. The casing 25 is fastened to the lower side of the casing 26 by means of the screw bolts 30. The casing 25 has an interiorly, screw-threaded, downwardly projecting extension 31 projecting through an opening in the casing 26, as shown in Figure 3.

In the installation of the device now under consideration, the drain plug 32 is removed from the lower part of the oil pan 11 and screwed into the extension 31 as shown in Figure 3. The nipple 27 is screwed into the opening for the drain plug 32 for thus installing the casings 25 and 26 on the bottom of the oil pan.

The tube 16 is connected with the coil 28 by means of the nipple 33 and the installation is complete.

In cold weather, when the engine is started, the valve 17 may be opened, and the hot exhaust gases will pass through the coil 24. The location of the fitting 15 is such that the exhaust gases passing around the valve opposite said fitting will be driven through the tube 16 and the coil 24 for securing a maximum efficiency.

The fitting 15 is located adjacent to the exhaust pipe 13 in order that the coil 24 may have the benefits of the exhaust gases from all the exhaust valve openings. The location of the fitting 15 opposite the exhaust valve is important and the location nearest the exhaust pipe 13 is thus of considerable importance.

The use of the device shown in Figures 2 and 3 makes it possible to install the device as shown on a large number of cars without in anyway cutting the wall of the oil pan and with a minimum of labor. All that is necessary for the installation on the oil pan is to remove the plug 32, install it in the casing 25 and screw the nipple 27 and the casing 25 to the exhaust pan.

The portion 28 of the coil 24 extends through a slot 34 in the wall of the casing 26. The slot 34 is large enough to permit the escape of the exhaust gases from the end 29 of the coil 24.

Use of the casing 26 affords a compartment or space 35 between the casings 26 and 25, which is always heated with exhaust gases and keeps the coil 24 and the casing 25 warm.

The oil from the oil pan 11 may flow through the nipple 27 in the opening 26ª into the casing 25 and around the coil 24, and when heated in the casing 25 will naturally flow back into the oil pan.

With a device of this kind, the oil in the oil pan can be heated very quickly to any desired temperature, so that it will be sufficiently liquid to be properly carried to the bearings to be lubricated.

In some cars, the coil 24 may be used without the casings hereinbefore referred to.

I have shown in Figure 4, the wall of the oil pan 11 provided with spaced openings 36 and 37 to receive the ends of the coil 24 on which are mounted washers 38 and nuts 39 for holding the coil snugly and rigidly in place and making oil tight joints. In the form of the device shown in Figure 4, the tube 16 is connected with the end 28 of the coil 24 outside the oil pan.

The form of the device used in Figure 4 is to be employed where the coil 24 can be inserted into the oil pan through some suitable opening originally provided therein.

Where there is no such opening, I provide the form of installation illustrated in Figure 5. When the form of installation shown in Figure 5 is employed, a suitable rectangular hole 40 is provided in the side of the oil pan 11. A cover plate 41 is provided for closing the opening 40 and has holes for receiving the ends of the coil 24, as shown in Figure 5, and for suitably supporting the coil 24. The plate 41 is placed on the outside of the oil pan with the gasket 42 suitably located. The frame 43 is placed on the inside of the oil pan around the opening 40 and suitable openings are provided, so that the plate 41, the oil pan 11 and the frame 43 may be bolted together by screw bolts 44 extended through the openings in the plate 41, the gasket 42 and the wall of the pan 11 and into screw-threaded openings in the frame 43.

It will be thus seen that when the hole 40 is provided, the coil may be inserted from the side of the pan 11, while installed on the plate 41, and the plate 41 may then be fastened in position.

Either form of the device will in practical use afford a satisfactory means for heating the oil in the oil pan.

As will be seen from the various forms illustrated, it is possible to embody my invention in various forms, and it is my intention to cover by the claims of the patent to be issued upon this application any modified forms of structure or use of mechanical equivalents, which may be reasonably included within their scope.

I claim as my invention:

1. The combination of a motor vehicle engine having an exhaust manifold, an exhaust pipe and an oil pan, a tube connected with the exhaust manifold, with a casing detachably supported on the bottom of the oil pan and communicating therewith for permitting circulation of lubricant between the pan and the casing, a coil in said casing connected with said tube and arranged to discharge to the air outside said casing, and a second casing receiving the first casing, supported thereon and spaced therefrom.

2. The combination of a motor vehicle engine having an exhaust manifold, an exhaust pipe and an oil pan, a tube connected with the exhaust manifold, with a casing detachably supported on the bottom of the oil pan and communicating therewith for permitting circulation of lubricant between the pan and the casing, a coil in said casing connected with said tube and arranged to discharge to the air outside said casing, and a second casing receiving the first casing, supported thereon and spaced therefrom, said casings having registering openings, an extension on the inner casing to the opening in the second casing, and a closure device for said extension.

3. The combination of a motor vehicle engine having an exhaust manifold, an exhaust pipe and an oil pan with a tube connected with the exhaust manifold near the exhaust pipe, a coil connected with said tube and adapted to be mounted on the oil pan, said tube being arranged opposite the exhaust valve of the motor vehicle nearest the exhaust pipe, and means for supporting said tube on the oil pan, said means comprising a casing receiving said tube, said casing having an opening to receive the drain plug of a motor vehicle, and a second casing screwed into the drain plug opening, the motor vehicle being provided with the drain plug and drain plug opening, said coil having its ends mounted in the wall of said casing.

4. The combination of a motor vehicle engine having an exhaust manifold, an exhaust pipe and an oil pan with a tube connected with the exhaust manifold near the exhaust pipe, a coil connected with said tube and adapted to be mounted on the oil pan, said tube being arranged opposite the exhaust valve of the motor vehicle nearest the exhaust pipe, and means for supporting said tube on the oil pan, said means comprising a casing receiving said tube, said casing having an opening to receive the drain plug of a motor vehicle, and a second casing screwed into the drain plug opening, the motor vehicle being provided with the drain plug and drain plug opening, said coil having its ends mounted in the wall of said casing, and a second casing receiving the first casing and spaced therefrom.

5. The combination of a motor vehicle having an oil pan with a tube connected with the exhaust manifold of the engine, a coil connected with said tube and adapted to be mounted on the oil pan, and means for supporting said tube on the oil pan, comprising a casing receiving said tube, said casing having an opening to receive the drain plug of a motor vehicle, and a second casing screwed into the drain plug opening, the motor vehicle being provided with a drain plug and drain plug opening, said coil having its ends mounted in the wall of said casing.

JOSEPH E. McCAUGHEY.